United States Patent
Oh

(10) Patent No.: US 10,269,280 B2
(45) Date of Patent: Apr. 23, 2019

(54) DISPLAY DEVICE AND METHOD OF MANUFACTURING THE SAME

(71) Applicant: Samsung Display Co., Ltd., Yongin-si, Gyeonggi-do (KR)

(72) Inventor: Sanghun Oh, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 506 days.

(21) Appl. No.: 15/052,584

(22) Filed: Feb. 24, 2016

(65) Prior Publication Data
US 2017/0042047 A1  Feb. 9, 2017

(30) Foreign Application Priority Data

Aug. 6, 2015 (KR) .......... 10-2015-0111205

(51) Int. Cl.
*G06F 3/041* (2006.01)
*G09G 3/20* (2006.01)
*G02F 1/1333* (2006.01)

(52) U.S. Cl.
CPC .......... *G09G 3/20* (2013.01); *G02F 1/133305* (2013.01); *G02F 2001/133357* (2013.01); *G02F 2001/133388* (2013.01); *G09G 2300/0426* (2013.01); *Y10T 428/10* (2015.01); *Y10T 428/1059* (2015.01)

(58) Field of Classification Search
CPC .. G09G 3/20; G09G 2300/0426; G09F 9/301; G02F 1/133305; G02F 1/133357; G02F 1/133388; G02F 2202/18; G06F 1/1652; Y10T 428/10; Y10T 428/1059
USPC .......... 428/1.1, 1.5; 361/749; 438/34, 38, 42
See application file for complete search history.

(56) References Cited

U.S. PATENT DOCUMENTS

| 7,787,097 | B2 | 8/2010 | Satoh |
| 2013/0169515 | A1 | 7/2013 | Prushinskiy et al. |
| 2014/0183473 | A1 | 7/2014 | Lee et al. |

FOREIGN PATENT DOCUMENTS

| JP | 2010-204377 A | 9/2010 |
| KR | 10-2014-0085956 A | 7/2014 |
| KR | 10-2015-0020895 A | 2/2015 |

*Primary Examiner* — Ruiyun Zhang
(74) *Attorney, Agent, or Firm* — F. Chau & Associates, LLC

(57) ABSTRACT

A display device and a method of manufacturing the same are disclosed. In one aspect, the display device includes a flexible substrate having a display area and a peripheral area outside the display area, and a second surface opposite to the first surface, and a display unit located on the display area. The display device also includes an adhesive layer located on the second surface of the flexible substrate, wherein a first groove is formed in a first portion of the adhesive layer and wherein the first portion corresponds to the peripheral area. The display device further includes a lower protective film located on the adhesive layer and having a first opening passing therethrough and overlapping the first groove in the depth dimension of the display device, and a first planarization layer at least partially filling the first groove.

20 Claims, 4 Drawing Sheets

DISPLAY DEVICE AND METHOD OF MANUFACTURING THE SAME

INCORPORATION BY REFERENCE TO ANY PRIORITY APPLICATIONS

This application claims the benefit of Korean Patent Application No. 10-2015-0111205, filed on Aug. 6, 2015, in the Korean Intellectual Property Office, the disclosure of which is incorporated herein in its entirety by reference.

BACKGROUND

Field

The described technology generally relates to a display device and a method of manufacturing the same.

Description of the Related Technology

In general, a display device includes a display unit located on a substrate. The substrate includes a display area and a peripheral area that is outside the display area and does not display images. In flexible displays, the substrate material must be flexible.

There have been recent attempts to increase the display area in the display device by reducing the size of the peripheral area. However, when the peripheral area is reduced, external impurities can easily infiltrate the display unit. This is because the display is sealed at its periphery, Thus, defects can occur in the display device or its lifespan can be diminished, In addition, the substrate and the display unit may be isolated from each other.

SUMMARY OF CERTAIN INVENTIVE ASPECTS

One inventive aspect relates to a display device that can reduce the likelihood of generating defects while reducing the peripheral area, and a method of manufacturing the display device.

Another aspect is a display device that includes a flexible substrate including a first surface including a display area and a peripheral area that is outside the display area, and a second surface opposite to the first surface, a display unit located on the display area of the flexible substrate, an adhesive layer located on the second surface of the flexible substrate and including a first groove at a portion corresponding to the peripheral area, a lower protective film located on the adhesive layer and including a first opening corresponding to the first groove, and a first planarization layer filling at least a part of the first groove.

The adhesive layer may include a plurality of first protrusions on a bottom surface of the first groove, and the first planarization layer may cover the plurality of first protrusions on the bottom surface of the first groove.

The first groove may extend along an edge of the flexible substrate,

The first planarization layer may include an organic material. For example, the first planarization layer may include polyimide or an acryl-based resin.

The adhesive layer may include a second groove at a portion corresponding to the peripheral area, and the display device may further include a second planarization layer filling at least a part of the second groove.

In this case, the adhesive layer may include a plurality of second protrusions on a bottom surface of the second groove, and the second planarization layer may cover the plurality of second protrusions on the bottom surface of the second groove.

The first groove and the second groove may extend along an edge of the flexible substrate.

The first planarization layer and the second planarization layer may include an organic material. The first planarization layer and the second planarization layer may include polyimide or an acryl-based resin.

The flexible substrate may be bent along the first groove so that the second surface may become an inner surface of the bent substrate and the first surface may become an outer surface of the bent substrate.

Another aspect is a method of manufacturing a display device that includes preparing a flexible substrate including a first surface including a display area and a peripheral area that is outside the display area, and a second surface opposite to the first surface, forming a display unit on the display area of the flexible substrate, attaching a lower protective film onto the second surface with an adhesive layer, forming an opening in the lower protective film to correspond to the peripheral area, and forming a groove in the adhesive layer to correspond to the opening, and forming a planarization layer filling at least a part of the first groove.

The forming of the planarization layer may include forming the planarization layer so as to cover the plurality of protrusions on the bottom surface of the groove.

The forming of the groove may include forming the groove so as to extend along an edge of the flexible substrate.

The planarization layer may include an organic material. For example, the planarization layer may include polyimide or an acryl-based resin.

The method may further include contacting the planarization layer with a support, and bending the flexible substrate along the groove so that the second surface may become an inner surface of the bent substrate and the first surface may become an outer surface of the bent substrate.

Another aspect is a display device comprising: a flexible substrate having a first surface comprising a display area and a peripheral area outside the display area, and a second surface opposite to the first surface; a display unit located on the display area of the flexible substrate; an adhesive layer located on the second surface of the flexible substrate, wherein a first groove is formed in a first portion of the adhesive layer, the first portion corresponding to the peripheral area; a lower protective film located on the adhesive layer and having a first opening passing therethrough and overlapping the first groove in the depth dimension of the display device; and a first planarization layer at least partially filling the first groove.

In the above display device, the adhesive layer comprises a plurality of first protrusions on a bottom surface of the first groove, wherein the first planarization layer covers the first protrusions.

In the above display device, the first groove extends along an edge of the flexible substrate.

In the above display device, the first planarization layer is formed of an organic material.

In the above display device, the organic material comprises polyimide or an acryl-based resin.

In the above display device, a second groove is formed at a second portion of the adhesive layer, wherein the second portion corresponds to the peripheral area, wherein the display device further comprises a second planarization layer at least partially filling the second groove.

In the above display device, the adhesive layer comprises a plurality of second protrusions on a bottom surface of the second groove and the second planarization layer covers the second protrusions.

In the above display device, the first and second grooves extend along an edge of the flexible substrate.

In the above display device, each of the first and second planarization layers comprises an organic material.

In the above display device, each of the first and second planarization layers comprises polyimide or an acryl-based resin.

In the above display device, the flexible substrate is bent along the first groove so that the second surface becomes an inner surface of the bent substrate and the first surface becomes an outer surface of the bent substrate.

Another aspect is a method of manufacturing a display device, the method comprising: preparing a flexible substrate comprising a first surface comprising a display area and a peripheral area outside the display area, and a second surface opposite to the first surface; forming a display unit on the display area of the flexible substrate; attaching a lower protective film to the second surface with an adhesive layer; forming a through hole in the lower protective film to correspond to the peripheral area; forming a groove in the adhesive layer to overlap the through hole in the depth dimension of the display device; and forming a planarization layer at least partially filling the first groove.

In the above method, the forming of the planarization layer comprises forming the planarization layer so as to cover the protrusions on a bottom surface of the groove.

In the above method, the forming of the groove comprises forming the groove so as to extend along an edge of the flexible substrate.

In the above method, the planarization layer comprises an organic material.

In the above method, the planarization layer comprises polyimide or an acryl-based resin.

The above method further comprises: contacting the planarization layer with a support; and bending the flexible substrate along the groove so that the second surface becomes an inner surface of the bent substrate and the first surface becomes an outer surface of the bent substrate.

Another aspect is a display device comprising: a flexible substrate comprising a first surface including a display area and a peripheral area outside the display area, and a second surface opposite to the first surface; a display unit located on the display area of the flexible substrate; an adhesive layer located on the second surface of the flexible substrate, wherein a first groove is formed at a first portion of the adhesive layer, the first portion corresponding to the peripheral area; a lower protective film located on the adhesive layer and having a first through hole overlapping the first groove in the depth dimension of the display device, wherein the first through hole has a width the same as or larger than that of the first groove.

The above display device further comprises a first planarization layer at least partially filling the first groove.

In the above display device, a second groove is formed at a second portion of the adhesive layer, wherein the second portion corresponds to the peripheral area, wherein the display device further comprises a second planarization layer at least partially filling the second groove.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
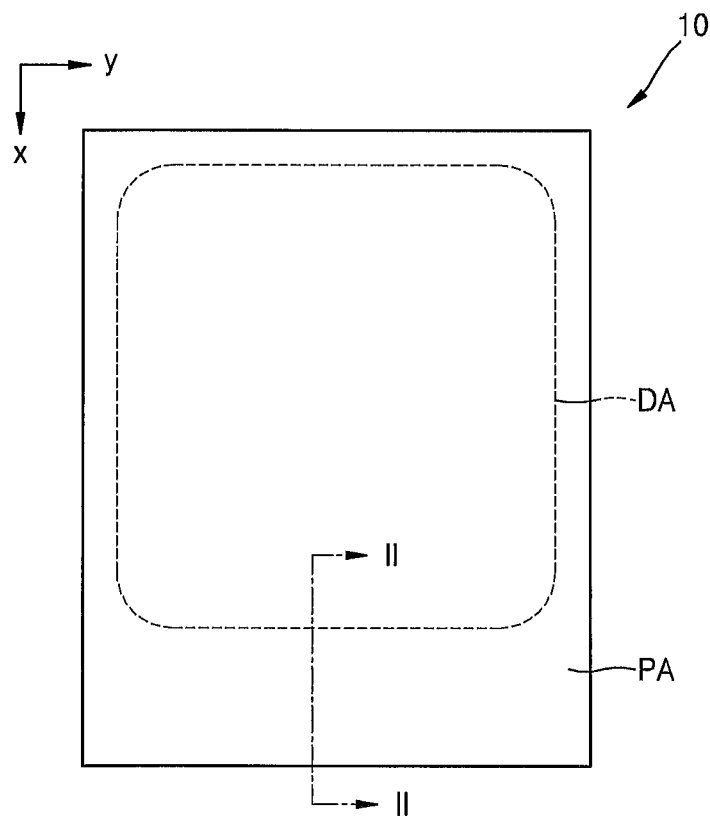
FIGS. 1 to 5 are plane views or cross-sectional views schematically illustrating processes of manufacturing a display device, according to an exemplary embodiment.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept.

Hereinafter, embodiments will be described in detail by with reference to the attached drawings. Like reference numerals in the drawings denote like elements.

Sizes of components in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

As used herein, the term "and/or" includes any and all combinations of one or more of the associated listed items. Expressions such as "at least one of," when preceding a list of elements, modify the entire list of elements and do not modify the individual elements of the list. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

FIGS. 1 to 5 are plan views and cross-sectional views schematically illustrating processes of manufacturing a display device, according to an exemplary embodiment.

A flexible substrate 10 is prepared as shown in FIG. 1. The flexible substrate 10 includes a first surface 11 (see FIG. 2) and a second surface 12 (see FIG. 2) opposite to the first surface 11. The first surface 11 includes a display area DA and a peripheral area PA surrounding the display area DA. An area of the peripheral area PA in a +x direction may be greater than that of the peripheral area PA in +y direction, −y direction, or −x direction as shown in FIG. 1, in order to ensure a space where pads for transferring electric signals to the display area DA are to be located.

The flexible substrate 10 may include various materials, as long as these materials can render the flexible substrate 10 flexible, e.g., a polymer resin such as polyimide. In this case, the flexible substrate 10 may be formed on a solid carrier (not shown), and the flexible substrate 10 may be isolated from the carrier later in manufacturing processes. The carrier may include, for example, glass, but is not limited thereto. Descriptions about the carrier will be omitted below.

Figure 2:
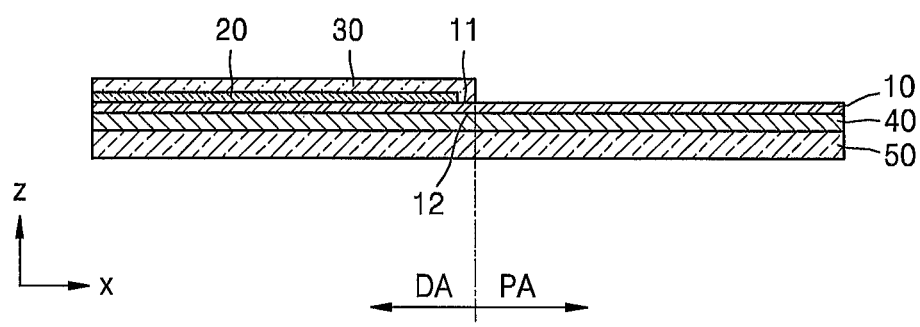

After preparing the flexible substrate 10, a display unit 20 is formed on the first surface 11 of the flexible substrate 10, for example, the display area DA of the first surface 11, as shown in FIG. 2, The display unit 20 may include various display devices. For example, the display unit 20 includes an organic light-emitting diode (PLED) display or a liquid crystal display (LCD), In order to protect the display unit 20 against external impurities or to improve visibility of images displayed by the display unit 20, a process of disposing a protective layer or an optical film 30 to cover the display unit 20 may be performed, as shown in FIG. 2.

In addition, a lower protective film 50 is attached to the second surface 12 of the flexible substrate 10 with an adhesive layer 40. The lower protective film 50 may protect the second surface 12 of the flexible substrate 10, or may improve a mechanical strength of the flexible substrate 10, if necessary.

Figure 3:
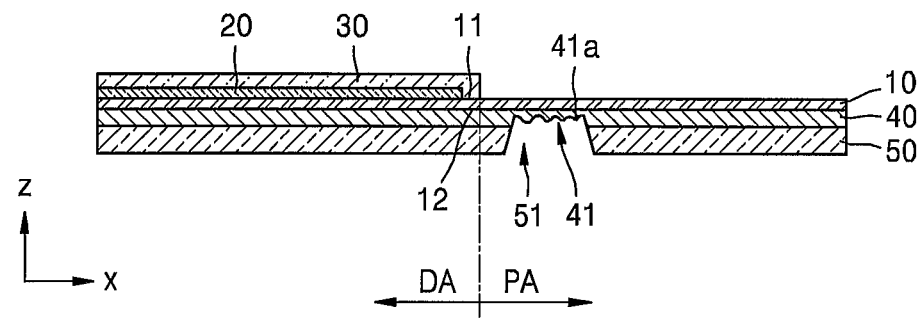

After that, as shown in FIG. 3, a first opening or first through hole 51 is formed in the lower protective film 50, at a portion corresponding to the peripheral area PA of the flexible substrate 10. The first opening 51 may be formed by, for example, irradiating a laser beam to the lower protective film 50 to remove the portion where the laser beam is irradiated. Here, the first opening 51 is not only formed in the lower protective film 50, but a portion of the adhesive layer 40 between the lower protective film 50 and the flexible substrate 10 may be removed. Accordingly, as shown in FIG. 3, a first groove 41 corresponding to the first opening 51 of the lower protective film 50 may be formed in the adhesive layer 40. The first opening 51 and the first groove 41 may be formed simultaneously or concurrently in the same process. Here, the first groove 41 is different from an opening or a through hole, that is, the first groove 41 may not completely remove the adhesive layer 40 so as not to expose the flexible substrate 10.

Figure 4:
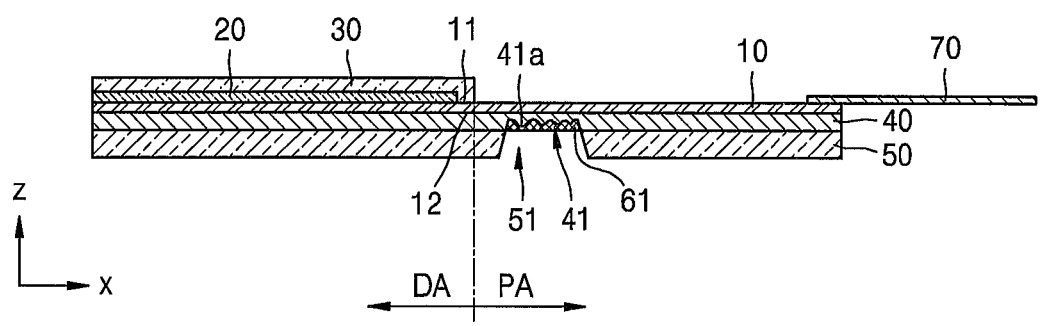

After forming the first opening 51 and the first groove 41, a first planarization layer 61. is formed so as to at least partially fill the first groove 41 as shown in FIG. 4. The first planarization layer 61 may only fill the first groove 41 of the adhesive layer 40, or may partially fill the first opening 51. The first planarization layer 61 may include an organic material, e.g., polyimide or an acryl-based resin. Such above material may be doped on the first groove 41 in a liquid phase via a nozzle, and then, ultraviolet rays are irradiated thereto so as to harden the material to form the first planarization layer 61.

As described above, when the first opening 51 and the first groove 41 are formed, a bottom surface of the first groove 41 may not even, but irregular. In particular, unlike the lower protective film 50, the adhesive layer 40 is highly viscose, the portion to which the laser beam is irradiated may not be removed clean. In this case, as shown in FIG. 3, a plurality of first protrusions 41a may remain on the bottom surface of the first groove 41. The first planarization layer 61 may cover the first protrusions 41a on the bottom surface of the first groove 41, and may have a flat upper surface in a −z direction.

Figure 5:
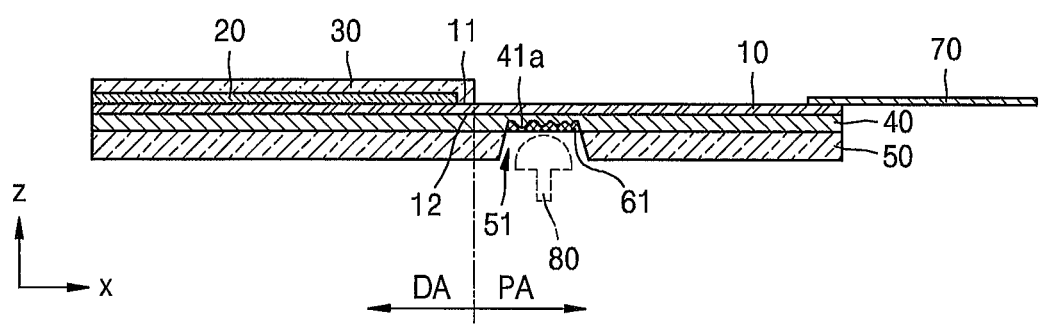
Figure 6:
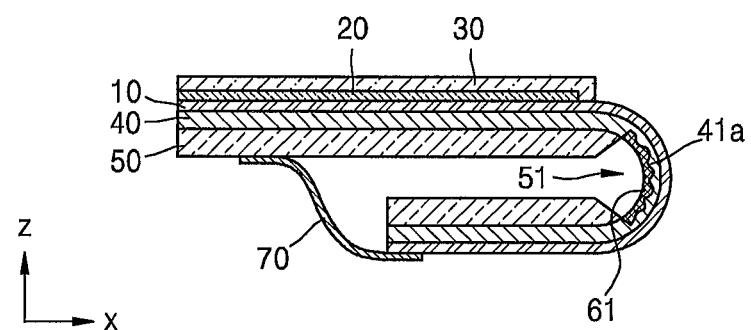
FIG. 6 is a schematic cross-sectional view of a part of a display device according to an exemplary embodiment.

After that, the flexible substrate 10 is curved about the first groove 41 so that a user may recognize as if an area of the peripheral area PA is reduced when viewing the display device. In order to curve the flexible substrate 10, a support 80 having a convex upper surface is located within the first opening 51 of the lower protective film 50, as shown in FIG. 5, such that an upper portion of the support 80 in a +z direction contacts the upper surface of the first Planarization layer 61 in the first groove 41. In addition, the flexible substrate 10 is curved by using the support 80 as shown in FIG. 6. When the flexible substrate 10 is curved, the second surface 12 of the flexible substrate 10 becomes an inner surface and the first surface 11 becomes an outer surface at the curved portion. In this case, due to the first opening 51 and the first groove 41, the flexible substrate 10 may be easily curved.

Accordingly, when the user views the display device from +z direction with respect to the display device, the user may recognize as if the area of the peripheral area PA that is outside the display area DA of the display device is relatively reduced.

In the above process, if the first planarization layer 61 does not exist, the first protrusions 41a on the bottom surface of the first groove 41 of the adhesive layer 40 contact the support 80. In this case, stress is locally concentrated onto portions of the flexible substrate 10, which correspond to the first protrusions 41a, and accordingly, cracks may occur in the flexible substrate 10.

However, when the display device is manufactured according to the present exemplary embodiment, the first planarization layer 61 covers the plurality of first protrusions 41a on the bottom surface of the first groove 41. In addition, since the upper surface of the first planarization layer 61 in the −z direction is substantially flat, local concentration of the stress may be prevented or reduced when bending the flexible substrate 10 by using the support 80. In addition, the generation of cracks in the flexible substrate 10 may be prevented or the frequency of generating the cracks may be greatly reduced.

In addition, after forming the first planarization layer 61, a flexible printed circuit board 70 may be attached to the flexible substrate 10, as shown in FIG. 4, and be electrically connected to the display unit 20. However, attaching of the flexible printed circuit board 70 on the flexible substrate 10 may be performed before or after the forming of the first planarization layer 61.

In addition, as shown in FIG. 6, in order to easily bend the flexible substrate 10, the first groove 41 may be formed to extend along with edges of the flexible substrate 10. That is, referring to FIG. 1, an edge of the flexible substrate 10 in the +x direction extends in the +y direction, and accordingly, the first groove 41 corresponding to the peripheral area PA in the +x direction from among the entire peripheral area PA of the flexible substrate 10 may extend in the +y direction.

Figure 7:
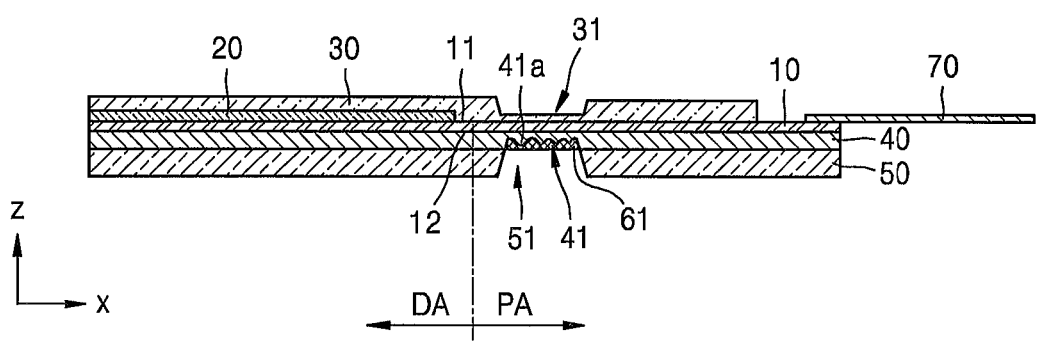
FIG. 7 is a schematic cross-sectional view of a part of a display device according to another exemplary embodiment.

In addition, the protective layer or an optical film 30 covering the display unit 20 may extend from the first surface 11 of the flexible substrate 10 to the peripheral area PA, as shown in FIG. 7, in order to prevent the external impurities from infiltrating into the display unit 20 effectively. In this case, an additional groove 31 may be formed in the protective layer or the optical film 30, as shown in FIG. 7. In particular, in this case, the additional groove 31 may correspond to the first groove 41, as shown in FIG. 7. As such, even when the protective layer or the optical film 30 extends to the peripheral area PA on the first surface 11 of the flexible substrate 10, the flexible substrate 10 may be easily curved.

Figure 8:
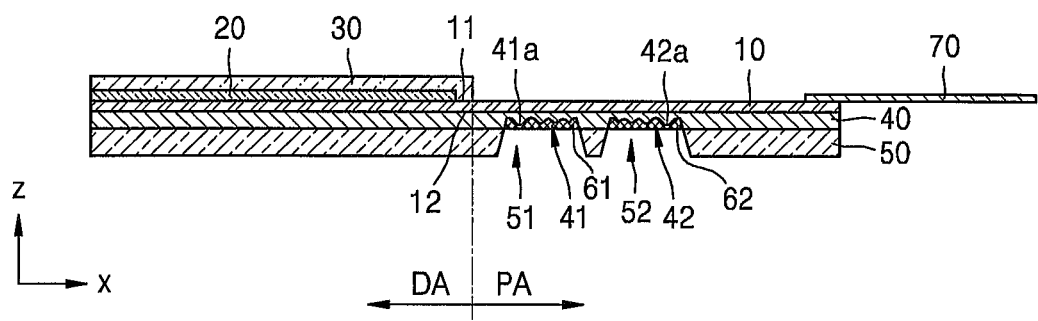
FIG. 8 is a schematic cross-sectional view of a part of a display device according to another exemplary embodiment.

The first opening 51 is formed in the lower protective film 50 and the first groove 41 is formed in the adhesive layer 40, but a second opening 52 may be formed in the lower protective film 50 in addition to the first opening 51 and a second groove 42 may be fanned in the adhesive layer 40 in addition to the first groove 41, as shown in FIG. 8. The second groove 42 and the second opening 52 may be formed simultaneously or concurrently by irradiating the laser beam. In this case, a plurality of second protrusions 42a may exist on a bottom surface of the second groove 42, and accordingly, a second planarization layer 62 may be disposed to cover the plurality of second protrusions 42a. The second planarization layer 62 may include a material. that is the same as or similar to that included in the first planarization layer 61. In addition, the second groove 42 may extend along with the edges of the flexible substrate 10, like the first groove 41.

Figure 9:
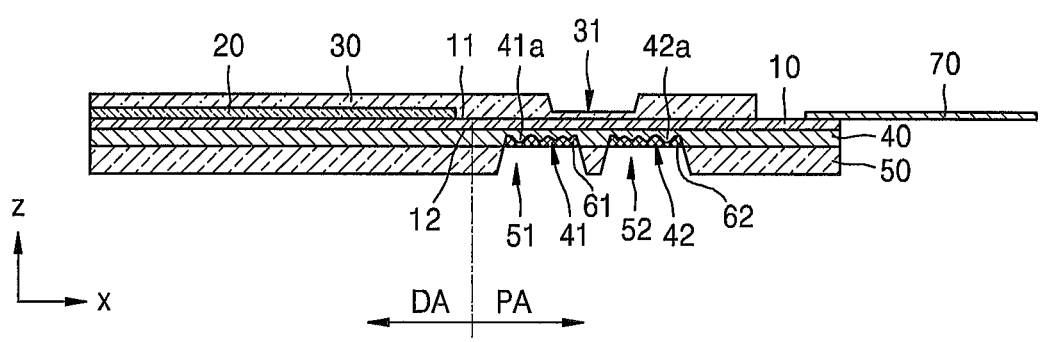
FIG. 9 is a schematic cross-sectional view of a part of a display device according to another exemplary embodiment.

In addition, the protective layer or the optical film 30 covering the display unit 20 may extend to the peripheral area PA on the first surface. 11 of the flexible substrate 10 as shown in FIG. 9, in order to prevent the external impurities from infiltrating into the display unit 20 effectively. In this case, an additional groove 31 may be formed in the protective layer or the optical film 30 as shown in FIG. 9, The additional groove 31 may correspond to a space between the first groove 41 and the second groove 42, as shown in FIG. 9, As such, even when the protective layer or the optical film 30 extends to the peripheral area PA on the first surface 11 of the flexible substrate 10, the flexible substrate 10 may be easily curved.

The method of manufacturing the display device is described above, but the described technology is not limited thereto. That is, one or more exemplary embodiments may be applied to the display device itself.

The display device according to an exemplary embodiment may have a structure shown in FIG. 4. That is, the display device may include the flexible substrate 10, the display unit 20, the adhesive layer 40, the lower protective film 50, and the first planarization layer 61.

The flexible substrate 10 including a polymer resin such as polyimide includes the first surface 11 including the display area DA and the peripheral area PA on outside of the display area DA and the second surface 12 that is opposite to the first surface 11. In addition, the display unit 20 including an OLED or an LCD is located on the display area DA of the flexible substrate 10. The adhesive layer 40 is located on the second surface 12 of the flexible substrate 10, and the lower protective film 50 covers the second surface 12 of the flexible substrate 10 via the adhesive layer 40. Here, the adhesive layer 40 includes the first groove 41 at a portion corresponding to the peripheral area PA, and the lower protective film 50 includes the first opening 51 corresponding to the first groove 41. In addition, the first planarization layer 61 fills at least a part of the first groove 41. The first planarization layer 61 may include an organic material, e.g., polyimide or an acryl-based resin.

In the display device according to the present exemplary embodiment, when forming the first opening 51 and the first groove 41 during the manufacturing processes, the bottom surface of the first groove 41 may not be flat, but may be irregular. For example, since the adhesive layer 40 is highly viscose unlike the lower protective film 50, a portion to which the laser beam is irradiated may not be removed clean. In this case, as shown in FIG. 4, the plurality of first protrusions 41a may remain on the bottom surface of the first groove 41.

However, since the display device according to the exemplary embodiment includes the first planarization layer 61, the first planarization layer 61 covers the first protrusions 41a on the bottom surface of the first groove 41 and may have an upper surface that is substantially flat in the −z direction. Accordingly, when the flexible substrate 10 is bent along the first groove 41 after the support 80 contacts the first planarization layer 61 within the first opening 51 as shown in FIG. 5, a defect rate may be greatly less than that of a case in which the support 80 directly contacts the plurality of first protrusions 41a on the bottom surface of the first groove 41 since there is no first planarization layer 61.

The display device in a status where the flexible substrate 10 is curved as shown in FIG. 6 may be also included in the scope of the one or more exemplary embodiments. As described above, in a case where the flexible substrate 10 is curved about the first groove 41, the second surface 12 of the flexible substrate 10 becomes the inner surface and the first surface 11 becomes the outer surface at the curved portion.

In addition, in order to easily implement the display device with the curved flexible substrate 10 as shown in FIG. 6, the first groove 41 may extend along the edge of the flexible substrate 10. That is, referring to FIG. 1, the edge of the flexible substrate 10 in the +x direction extends in the +y direction, and accordingly, the first groove 41 corresponding to the peripheral area PA of the flexible substrate 10 in the +x direction may be elongated in the +y direction.

In addition, the display device according to the exemplary embodiment includes the protective layer or the optical film 30 covering the display unit 20, and the display device according to another exemplary embodiment may include the protective layer or the optical film 30 extending to the peripheral area PA on the first surface 11 of the flexible substrate 10, in order to prevent external impurities from infiltrating into the display unit 20. In this case, the protective layer or the optical film 30 may include the additional groove 31 as shown in FIG. 7. In particular, the additional groove 31 may correspond to the first groove 41 as shown in FIG. 7. As such, even when the protective layer or the optical film 30 extends to the peripheral area PA on the first surface 11 of the flexible substrate 10, the flexible substrate 10 may be easily curved.

The lower protective film 50 includes the first opening 51 and the adhesive layer 40 includes the first groove 41 according to the above description, but the lower protective film 50 may include the second opening 52 in addition to the first opening 51 and the adhesive layer 40 may include the second groove 42 in. addition to the first groove 41 as shown in. FIG. 8. In this case, the plurality of second protrusions 42a may exist on the bottom surface of the second groove 42, and accordingly, the second planarization layer 62 may fill at least a part of the second groove 42 so as to cover the plurality of second protrusions 42a, The second planarization layer 62 may include an organic material like the first planarization layer 61, for example, polyimide or an acryl-based resin. in addition, the second groove 42 may extend along the edge of the flexible substrate 10, like the first groove 41.

In addition, the protective layer or the optical film 30 covering the display unit 20 may also extend to the peripheral area PA on the first surface 11 of the flexible substrate 10 as shown in FIG, 9, in order to prevent external impurities from infiltrating into the display unit 20 effectively. In this case, the protective layer or the optical film 31 may include the additional groove 31 as shown in FIG. 9. in particular, the additional groove 31 may correspond to a space between the first groove 41 and the second groove 42 as described in FIG. 9. As such, even when the protective layer or the optical film 30 extends to the peripheral area. PA on the first surface 11 of the flexible substrate 10, the flexible substrate 10 may be easily curved.

In addition, the protective layer or the optical film 30 covering the display unit 20 may also extend to the peripheral area PA on the first surface 11 of the flexible substrate 10 as shown in FIG. 9, in order to prevent external impurities from infiltrating into the display unit 20 effectively. In this case, the protective film or the optical film 31 may include the additional groove 31 as shown in FIG. 9. In particular, the additional groove 31 may correspond to a space between the first groove 41 and the second groove 42 as described in FIG. 9. As such, even when the protective layer or the optical film 30 extends to the peripheral area PA on the first surface 11 of the flexible substrate 10, the flexible substrate 10 may be easily curved.

According to one or more exemplary embodiment, the display device and the method of manufacturing the display device may reduce a defect rate while reducing an area of the peripheral area that is outside the display area.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A display device comprising:
    a flexible substrate having a first surface comprising a display area and a peripheral area outside the display area, and a second surface opposite to the first surface;
    a display unit located on the display area of the flexible substrate;
    an adhesive layer located on the second surface of the flexible substrate, wherein a first groove is formed in a first portion of the adhesive layer, the first portion corresponding to the peripheral area;
    a lower protective film located on the adhesive layer and having a first opening passing there through and overlapping the first groove in a depth dimension of the display device; and
    a first planarization layer at least partially filling the first groove.

2. The display device of claim 1, wherein the adhesive layer comprises a plurality of first protrusions on a bottom surface of the first groove, and wherein the first planarization layer covers the first protrusions.

3. The display device of claim 1, wherein the first groove extends along an edge of the flexible substrate.

4. The display device of claim 1, wherein the first planarization layer is formed of an organic material.

5. The display device of claim 4, wherein the organic material comprises polyimide or an acryl-based resin.

6. The display device of claim 1, wherein a second groove is formed at a second portion of the adhesive layer, wherein the second portion corresponds to the peripheral area, and wherein the display device further comprises a second planarization layer at least partially filling the second groove.

7. The display device of claim 6, wherein the adhesive layer comprises a plurality of second protrusions on a bottom surface of the second groove and the second planarization layer covers the second protrusions.

8. The display device of claim 6, wherein the first and second grooves extend along an edge of the flexible substrate.

9. The display device of claim 6, wherein each of the first and second planarization layers comprises an organic material.

10. The display device of claim 9, wherein each of the first and second planarization layers comprises polyimide or an acryl-based resin.

11. The display device of claim 1, wherein the flexible substrate is bent along the first groove so that the second surface becomes an inner surface of the bent flexible substrate and the first surface becomes an outer surface of the bent flexible substrate.

12. A method of manufacturing a display device, the method comprising:
    preparing a flexible substrate comprising a first surface comprising a display area and a peripheral area outside the display area, and a second surface opposite to the first surface;
    forming a display unit on the display area of the flexible substrate;
    attaching a lower protective film to the second surface with an adhesive layer;
    forming a through hole in the lower protective film to correspond to the peripheral area;
    forming a groove in the adhesive layer to overlap the through hole in a depth dimension of the display device; and
    forming a planarization layer at least partially filling the groove.

13. The method of claim 12, wherein the forming of the planarization layer comprises forming the planarization layer so as to cover a plurality of protrusions on a bottom surface of the groove.

14. The method of claim 12, wherein the forming of the groove comprises forming the groove so as to extend along an edge of the flexible substrate.

15. The method of claim 12, wherein the planarization layer comprises an organic material.

16. The method of claim 15, wherein the planarization layer comprises polyimide or an acryl-based resin.

17. The method of claim 12, further comprising:
    contacting the planarization layer with a support; and
    bending the flexible substrate along the groove so that the second surface becomes an inner surface of the bent flexible substrate and the first surface becomes an outer surface of the bent flexible substrate.

18. A display device comprising:
    a flexible substrate comprising a first surface including a display area and a peripheral area outside the display area, and a second surface opposite to the first surface;
    a display unit located on the display area of the flexible substrate; an adhesive layer located on the second surface of the flexible substrate, wherein a first groove is formed at a first portion of the adhesive layer, the first portion corresponding to the peripheral area;
    a lower protective film located on the adhesive layer and having a first through hole overlapping the first groove in a depth dimension of the display device, wherein the first through hole has a width the same as or larger than that of the first groove.

19. The display device of claim 18, further comprising a first planarization layer at least partially filling the first groove.

20. The display device of claim 19, wherein a second groove is formed at a second portion of the adhesive layer, wherein the second portion corresponds to the peripheral area, and wherein the display device further comprises a second planarization layer at least partially filling the second groove.

* * * * *